United States Patent [19]
Poplingher et al.

[11] Patent Number: 5,815,700
[45] Date of Patent: Sep. 29, 1998

[54] BRANCH PREDICTION TABLE HAVING POINTERS IDENTIFYING OTHER BRANCHES WITHIN COMMON INSTRUCTION CACHE LINES

[75] Inventors: Mircea Poplingher, Campbell; Tse-Yu Yeh, Milpitas; Wenliang Chen, Sunnyvale, all of Calif.

[73] Assignee: Intel Corporation, Santa Clara, Calif.

[21] Appl. No.: 576,954

[22] Filed: Dec. 22, 1995

[51] Int. Cl.$^6$ .......................................................... G06F 9/32
[52] U.S. Cl. .................................................................. 395/587
[58] Field of Search ..................................... 395/586, 587

[56] References Cited

U.S. PATENT DOCUMENTS

| | | | |
|---|---|---|---|
| 4,943,908 | 7/1990 | Emma et al. | 395/587 |
| 4,991,080 | 2/1991 | Emma et al. | 395/382 |

OTHER PUBLICATIONS

Sonh et al, An Implementation of Branch Target Buffer for High Performance Applications, IEEE Tencon. IEEE Region 10 International Conference on Microelectronics and VLSI, pp. 492–495, 1995.

*Primary Examiner*—Richard L. Ellis
*Attorney, Agent, or Firm*—Blakely, Sokoloff, Taylor & Zafman

[57] ABSTRACT

A branch prediction system is described for use within a microprocessor having an instruction cache capable of storing two or more instructions per cache line. Each entry of a branch prediction table (BPT) includes a value identifying whether at least one other instruction within a common cache line contains a branch. The value is referred to herein as a multiple-B bit value. The multiple-B bit value is examined by branch prediction logic while one branch prediction is being performed to determine whether a second branch prediction can be initiated for another branch within the same cache line. In one implementation, the multiple-B bit of one BPT entry is examined following a hit. A branch prediction for the entry generating a hit is initiated. Simultaneously, the BPT is reaccessed to search for an entry corresponding to another instruction within the same cache line if the multiple-B bit for the first entry was set. If the second entry is found, a secondary branch prediction is initiated. Eventually, the first branch prediction is output. If the first branch prediction is Not Taken, then the second branch prediction is output during the next clock cycle. If the first branch prediction is Taken, then the second branch prediction may be aborted as it is not needed. Method and apparatus embodiments of the invention are described.

18 Claims, 4 Drawing Sheets

BRANCH PREDICTION TABLE HAVING POINTERS IDENTIFYING OTHER BRANCHES WITHIN COMMON INSTRUCTION CACHE LINES

BACKGROUND OF THE INVENTION

1. Field of the Invention

The invention generally relates to methods and apparatus for performing branch predictions within microprocessors. More specifically, the invention relates to a branch prediction table for use within a microprocessor having an instruction cache storing multiple instructions per cache line.

2. Description of Related Art

State of art microprocessors often employ pipelining to enhance performance. Within a pipelined microprocessor, the functional units necessary for executing different stages of an instruction are operated simultaneously on multiple instructions to achieve a degree of parallelism leading to performance increases over non-pipelined microprocessors. As an example, an instruction fetch unit, an instruction decode and execute unit and an instruction execution unit may operate simultaneously. During one clock cycle, the instruction execution unit executes a first instruction while the instruction decode and execute unit decodes a second instruction and the fetch unit fetches a third instruction. During a next clock cycle, the execution unit executes the newly decoded instruction while the instruction decode and execute unit decodes the newly fetched instruction and the fetch unit fetches yet another instruction. In this manner, neither the fetch unit nor the decode need wait for the execution unit to execute the last instruction before processing new instructions. In state of art microprocessors, the steps necessary to fetch and execute an instruction are sub-divided into a larger number of stages to achieve a deeper degree of pipelining.

A pipelined microprocessor operates most efficiently when instructions are executed in the sequence in which the instructions appear in memory. Unfortunately, such is typically not the case. Rather, computer programs typically include a large number of branch instructions which, upon execution, may cause instructions to be executed in a sequence other than as set forth in memory. More specifically, when a branch instruction is executed, execution continues either with the next sequential instruction from memory or execution jumps to an instruction specified at a "branch target" address. The branch specified by the instruction is said to be "Taken" if execution jumps and "Not Taken" if execution continues with the next sequential instruction from memory.

Branch instructions are either unconditional or conditional. An unconditional branch is Taken every time the instruction is executed. A conditional branch instruction is Taken or Not Taken depending upon resolution of a condition such as a logic statement. Instructions to be executed following a conditional branch are not known with certainty until the condition upon which the branch depends is resolved. However, rather than wait until the condition is resolved, state of the art microprocessors perform a branch prediction whereby the microprocessor tries to determine whether the branch will be Taken or Not Taken and, if Taken, to predict or otherwise determine the target address for the branch. If the branch is predicted to be Not Taken, the microprocessor fetches and speculatively executes the next instruction in memory. If the branch is predicted to be Taken, the microprocessor fetches and speculatively executes the instruction found at the predicted branch target address. The instructions executed following the branch prediction are "speculative" because the microprocessor does not yet know whether the prediction will be correct or not. Accordingly, any operations performed by the speculative instructions cannot be fully completed. For example, if a memory write operation is performed speculatively, the write operation cannot be forwarded to external memory until all previous branch conditions are resolved, otherwise the instruction may improperly alter the contents of the memory based on a mispredicted branch. If the branch prediction is ultimately determined to be correct, the speculatively executed instructions are retired or otherwise committed. For the example of a memory write, the write operation is therefore forwarded to external memory. If the branch prediction is ultimately found to be incorrect, then any speculatively executed instructions following the mispredicted branch are typically flushed from the system. For the memory write example, the write is not forwarded to external memory but rather is discarded.

As can be appreciated, when a branch prediction is correct, a considerable windfall in processor performance is gained. If the branch prediction is incorrect, the microprocessor is no worse off then had it simply waited until resolution of the branch condition initially.

A wide variety of techniques have been developed for performing branch prediction. Typically, various tables are provided for storing a history of previous branch predictions along with indications of whether the branch predictions were proven to be correct or not. Predictions are made for newly encountered branches by evaluating the history of prior branch executions and/or predictions. In some microprocessors, the logic for performing branch predictions is quite complex and time consuming. It is, however, desirable to perform the branch prediction as quickly as possible. A correct branch prediction is of little use if not made promptly. Ideally, branch prediction is performed using the same number of clock cycles as an instruction cache fetch requires to fetch instruction to thereby ensure that the instruction cache need not be stalled waiting for instruction pointers corresponding to predicted branches.

Figure 1:
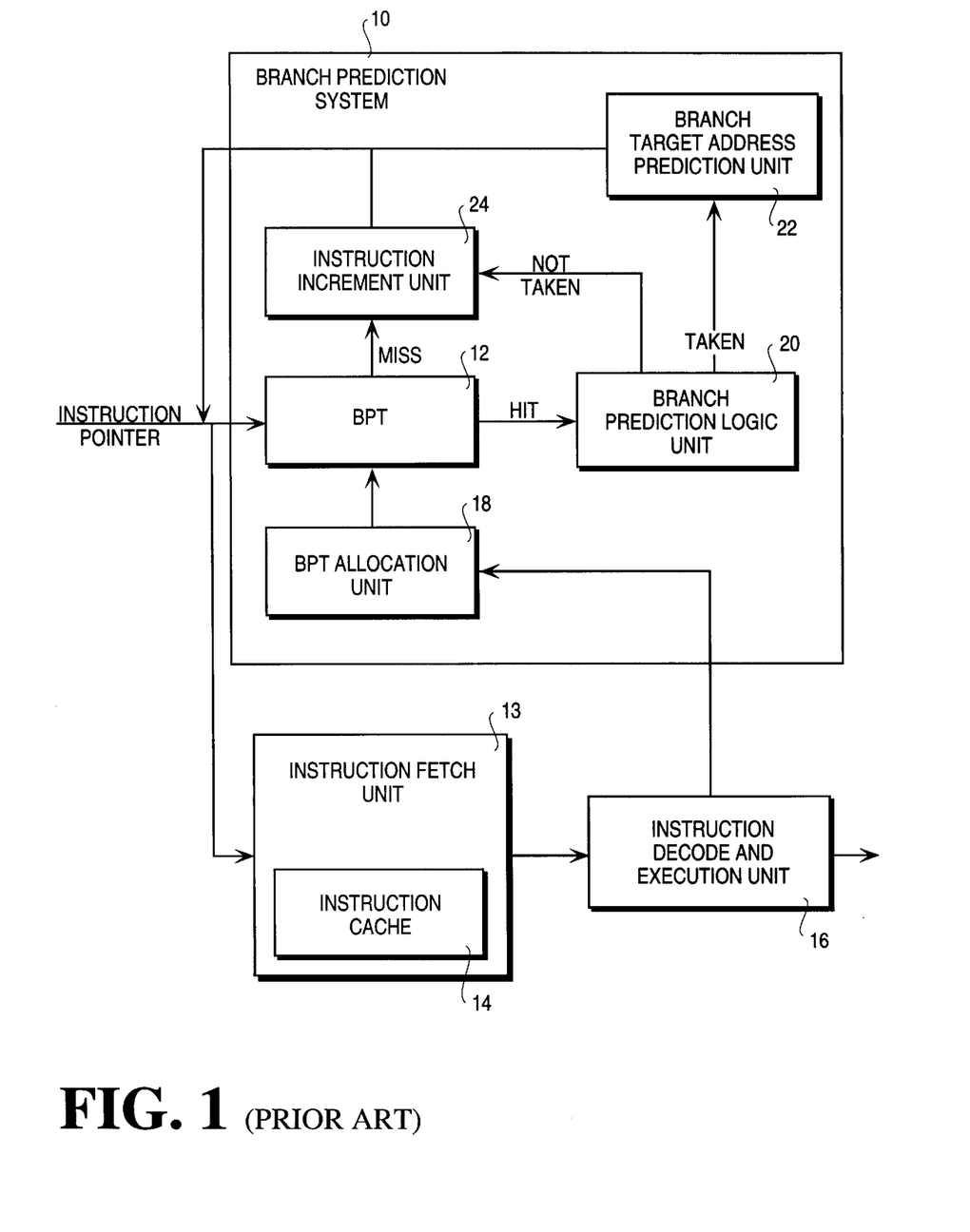
FIG. 1 is a block diagram of a generic branch prediction system configured in accordance with the prior art.

To expedite branch prediction, some state of the art microprocessors include a branch prediction table (BPT) which provides a cache of the most recently predicted branches along with corresponding prediction information such as a brief history of previous executions and/or predictions for that branch and the success thereof. FIG. 1 illustrates the branch prediction system incorporating a BPT. More specifically, FIG. 1 illustrates a branch prediction system 10 having a BPT 12, an instruction fetch unit (IFU) 13 incorporating an instruction cache (ICache) 14, and an instruction decode and execute unit 16. A BPT allocation unit 18 allocates entries in BPT 12. A branch prediction unit 20 performs branch predictions based upon hit signals and branch history received from BPT 12. The branch prediction is either Taken or Not Taken. A branch target address prediction unit 22 attempts to predict the address for any branch predicted to be Taken.

In use, an instruction pointer specifying a new instruction is received simultaneously by BPT 12 and IFU 13. While IFU 13 fetches an instruction corresponding to the instruction pointer, perhaps by accessing ICache 14, the BPT determines whether information corresponding to a previous branch prediction for same instruction is contained within its cache lines and generates a hit signal or a miss signal accordingly. In many implementations, the BPT is accessed using a tag value provided within the instruction pointer and corresponding to tag values employed by the ICache for identifying cache lines therein. Initially, the BPT is empty and a miss signal is thereby generated. An instruction counter unit 24 receives the miss signal and increments the instruction pointer by one to identify the next sequential instruction. In other words, when the BPT generates a miss signal, the overall system assumes that either the corresponding instruction does not contain a branch or, if it does contain a branch, the branch will be Not Taken. The new incremented instruction pointer is fed back to both the BPT and IFU. The BPT and IFU input and process the new instruction. Simultaneously, instruction decode and execute unit 16 decodes the instruction previously fetched by the IFU. Instruction decode and execute unit 16 examines a branch bit within the instruction received from the IFU to determine whether the instruction includes a branch condition. If so, instruction decode and execute unit 16 activates BPT allocate unit 18 to allocate an entry within the BPT corresponding to the branch. Depending upon the implementation, the entry within the BPT identifies the instruction pointer or a corresponding tag address, as well as other information such as the type of branch.

As the execution continues, more and more entries are allocated within the BPT based upon branch instructions fetched by the IFU. Eventually, the BPT receives an instruction pointer corresponding to an entry contained therein and generates a hit signal. The branch prediction unit then predicts whether the branch is to be Taken or Not Taken. To this end, the branch prediction unit may access information stored within the hit entry of the BPT as well as other prediction information contained within separate tables (not shown). If the prediction is Not Taken, then the instruction increment unit 24 is again activated to merely increment the instruction pointer by one. If the branch is predicted to be Taken, then the branch target address prediction unit is activated to predict the resulting branch target address. In many cases, the branch address is merely specified within the branch instruction itself and the branch target address prediction is therefore straightforward. In other cases, such as with self modifying code, branch target address prediction may be somewhat more complex. In either case, the branch target address prediction unit outputs a new instruction pointer corresponding to the branch target address which is fed back to both the BPT and the IFU. Preferably, the various components of the branch prediction system are configured to perform a branch prediction in the same number of clock cycles that the IFU requires to fetch one instruction, typically one clock cycle.

As noted, instructions fetched by the IFU and decoded by the instruction decode and execute unit are executed elsewhere within the microprocessor. If the instructions were fetched using instruction pointers generated by the branch prediction system, then the instructions are initially regarded as being speculative. Ultimately, branch conditions contained therein are evaluated and the accuracy of previous branch predictions can be verified. If correct, the speculatively executed instructions are then retired or otherwise committed. If incorrect, the instructions are flushed. In either case, entries within the BPT corresponding to the predicted branches are updated to reflect whether the prediction was correct. Depending upon the implementation, each entry within the BPT may store a history of branch predictions along with an indication of whether the predictions were correct. Any additional tables accessed by branch prediction unit 20 may also be updated.

In this manner, the branch prediction system develops a history of branch predictions to assist in refining future predictions to achieve ever increasing ratios of correct predictions to incorrect predictions. Of course, BPT 12 is of finite size and entries may need to be deallocated to allow room for allocation of new entries corresponding newly found branches. Accordingly, circumstances may arise where the BPT receives an instruction pointer corresponding to a previously predicted branch for which no entry is found within the BPT. In the implementation of FIG. 1, a miss signal is generated and the instruction pointer is merely incremented. In other implementations, the branch prediction system may perform a branch prediction, perhaps using tables associated with the branch prediction unit, even though an entry is not found within the BPT. In other words, branch prediction need not be limited only to branches having entries allocated within the BPT. With the implementation of FIG. 1, however, a branch prediction of Not Taken is implicitly provided whenever no entry is found within the BPT. To prevent such implicit predictions from skewing future predictions, the entries of the BPT and any tables associated with the branch prediction unit are preferably updated only to reflect the accuracy of branch Taken predictions. Although this procedure helps prevent implicit branch Not Taken predictions from skewing future branch predictions, it prevents information corresponding to explicit predictions of Not Taken branches from being advantageously utilized.

Thus, what has been described with reference to FIG. 1 is a typical branch prediction system for use with an instruction fetch unit having an ICache providing one instruction per cache line. In many state of the art systems, however, ICache units store two or more instructions per cache line. Typically, the separate instructions are referred to as instruction bundles. As such, during one clock cycle, the IFU may fetch two or more instructions with each instruction possibly specifying a branch condition. Accordingly, the BPT may have a separate entry for each separate instruction of a single cache line. Consider, for example, an arrangement where the ICache stores two instructions per cache line. Either both instructions are branches, neither are branches, or only one is a branch. The BPT will have either two entries corresponding to the cache line, one entry or no entries. However, there is not necessarily a direct correlation between the entries of the BPT and the branches, if any, of the cache line. For example, the cache line may contain two branches, but neither may be allocated within the BPT. In other cases, only one of the two branches may be allocated within the BPT. In other cases, only one of the instructions of the cache line may have a branch which may or may not be allocated within the BPT. As can be appreciated, the BPT, as well as other components of the branch prediction system, should be configured to account for the possibility of two branches in one instruction line.

In one arrangement, the BPT is accessed using a tag value as described above, but is configured to output two hit signals if two entries match the tag. Only one hit signal is output if only one entry matches the tag. A miss signal is output only no entries match the tag. If two hit signals are generated, the BPT also outputs the information contained in the corresponding entries. There is, however, no easy way of ensuring that the values output along with the first hit signal correspond to the first instruction of the corresponding cache line or the second instruction of the cache line. Accordingly, a rotate operation is performed to reorder, if necessary, the information output from the BPT. Thereafter, a branch prediction is performed using the branch information of the first instruction. Even if only a single hit signal is generated, the rotation operation is still performed to determine whether the information output from the BPT corresponds to the first instruction or the second instruction of the corresponding cache line. The rotate operation is avoided only if a miss signal is generated.

Thus, a rotate operation is performed after the BPT is accessed but before a branch prediction can be performed. Accordingly, an additional pipe stage is required to accommodate the rotate operation. As such, the branch prediction system cannot output a new branch target address for at least an additional clock cycle and therefore cannot always keep pace with the IFU which can fetch two instructions per clock cycle. Circumstances may therefore arise where the IFU needs to be intentionally stalled to allow the branch prediction system to "catch up" thereby limiting IFU performance.

Hence, it would be desirable to provide an instruction branch prediction technique, for use within a microprocessor having an ICache capable of storing two or more instructions per cache line, which does not require a rotate operation to be performed. In particular, it would be desirable to provide an instruction branch prediction technique, for use with a microprocessor having an ICache storing two instructions per cache line, which allows, under at least some circumstances, two branch predictions to be performed in two consecutive clock cycles based on two branches of the single instruction cache line. It is to this end that aspects of the present invention are drawn.

SUMMARY OF THE INVENTION

In accordance with one aspect of the invention, a branch prediction table is provided for use within a microprocessor having an instruction cache providing two or more instructions per cache line stored in different bundle positions. Entries of the BPT are accessed using a tag value and a bundle position value. Each entry of the BPT includes a value, hereinafter referred to as a multiple-B bit, identifying whether any other instructions within the cache line corresponding to the BPT entry include branches.

By accessing the BPT with a tag value and a bundle position value, only a single entry, if any, will be found within the BPT for each access. Accordingly, only a single hit signal need be generated and no rotate operation need be performed. However, by providing the multiple-B bit value, branch prediction logic associated with the BPT can readily determine whether other instructions within the cache line also contain branches. If so, the branch prediction logic immediately reaccesses the BPT to determine if other entries are allocated corresponding to the same cache line. By immediately reaccessing the BPT, the branch prediction logic can promptly begin to perform a branch prediction for subsequent branches within the same cache line without waiting to complete a prediction for the first branch of the cache line. For example, if the branch prediction logic predicts that the first branch will be Not Taken and the next branch within the same cache line also has an entry allocated within the BPT, then the logic can immediately begin evaluating BPT information corresponding to the other branch for promptly performing a branch prediction thereon. As such, a second branch prediction corresponding to a second branch within a single cache line may be evaluated and output promptly after a branch Not Taken prediction is output for a first instruction of the cache line. Preferably, the second prediction is output in the following clock cycle.

In one implementation, the improved BPT is employed within a microprocessor having an instruction cache having, at most, two instructions per cache line. As such, the BPT will include, at most, two entries corresponding to a cache line. The BPT is initially accessed using the tag and bundle position address of the first instruction of the cache line. If the corresponding entry is found within the BPT, a single hit signal is generated and branch prediction values corresponding to that instruction are output from the BPT for evaluation by branch prediction logic. The multiple-B bit value is examined to determine if the other instruction of the cache line contains a branch as well. If so, the BPT is immediately reaccessed to determine whether the BPT also includes an entry for the second instruction. If so, and a branch prediction of Not Taken is determined for the first instruction, then a branch prediction for the second instruction can be generated promptly by the branch prediction logic. Even if an entry corresponding to the second instruction is not found within the BPT, the branch prediction logic at least knows that the second instruction of the cache line includes a branch condition. Accordingly, the branch prediction logic may, depending upon the implementation, attempt a branch prediction for the second instruction even though no entry is contained within the BPT for the second instruction.

In other embodiments, the BPT is employed in connection with instruction caches having N instructions per cache line wherein N is greater than two. In such embodiments, the BPT includes a multiple-B bit value identifying whether at least one of the other instructions contains a branch. An additional value is provided identifying the location of the next branch. Consider, for example, an embodiment where N equals 8 and wherein the first, third and fifth instructions of the eight instruction cache line have branches. An entry within the BPT corresponding to the first instruction includes a value pointing to the third instruction. Likewise, an entry within the BPT corresponding to the third instruction has a value pointing to the fifth instruction. The fifth instruction need not include a value pointing to the first instruction since the first instruction will be evaluated prior to the fifth instruction. Each of the three entries includes a multiple-B bit indicating that at least one other branch is contained within the cache line. In an alternative implementation, a separate multiple-B bit value is not provided. Rather, the instruction pointer value is set to zero to indicate that no other instructions contain branches. The use of a separate multiple-B bit, however, allows the branch prediction logic to more quickly determine whether at least one additional branch is provided to facilitate a second access to the branch prediction table.

Thus, the invention facilitates branch prediction operations for instructions found within multi-instruction cache lines, in part, by eliminating the need to perform a reorder and rotate operation. By eliminating the reorder and rotate operation, a prediction for a first branch within the cache line may be performed more quickly than in embodiments requiring the reorder and rotate operation thereby allowing, in some embodiments, the first branch prediction to be performed within one clock cycle. By performing a second access to the BPT immediately following a hit signal corresponding to an entry having a set multiple-B bit, the branch prediction logic can thereby perform a branch prediction for a second instruction within the cache line promptly, at least in circumstances where the BPT also contains an entry for the additional branch instruction. Depending upon the implementation, the foregoing allows the second branch prediction to be performed in the clock cycle immediately following the first branch prediction. In other words, two branch predictions are performed in only two clock cycles, at least under optimal circumstances. Accordingly, the broad objectives set forth above are achieved. Other objects, features and advantages of the invention will be apparent from the detailed description which follows and from the accompanying drawings.

DETAILED DESCRIPTION OF EXEMPLARY EMBODIMENTS OF THE INVENTION

With reference to the remaining figures, exemplary embodiments of the invention will now be described. The exemplary embodiments are described primarily with reference to block diagrams and flowcharts. As to the flowcharts, each block within the flowcharts represents both the method step and an apparatus element for performing the method step. Herein, the apparatus element may be referred to as a means for, an element for, or a unit for performing the method step. Depending upon the implementation, the apparatus element, or portions thereof, may be configured in hardware, software, firmware or combinations thereof. As to the block diagrams, it should be appreciated that not all components necessary for a complete implementation of a practical system are illustrated or described in detail. Rather, only those components necessary for a thorough understanding of the invention are illustrated and described. Furthermore, components which are either conventional or may be readily designed and fabricated in accordance with the teachings provided herein are not described in detail.

Figure 2:
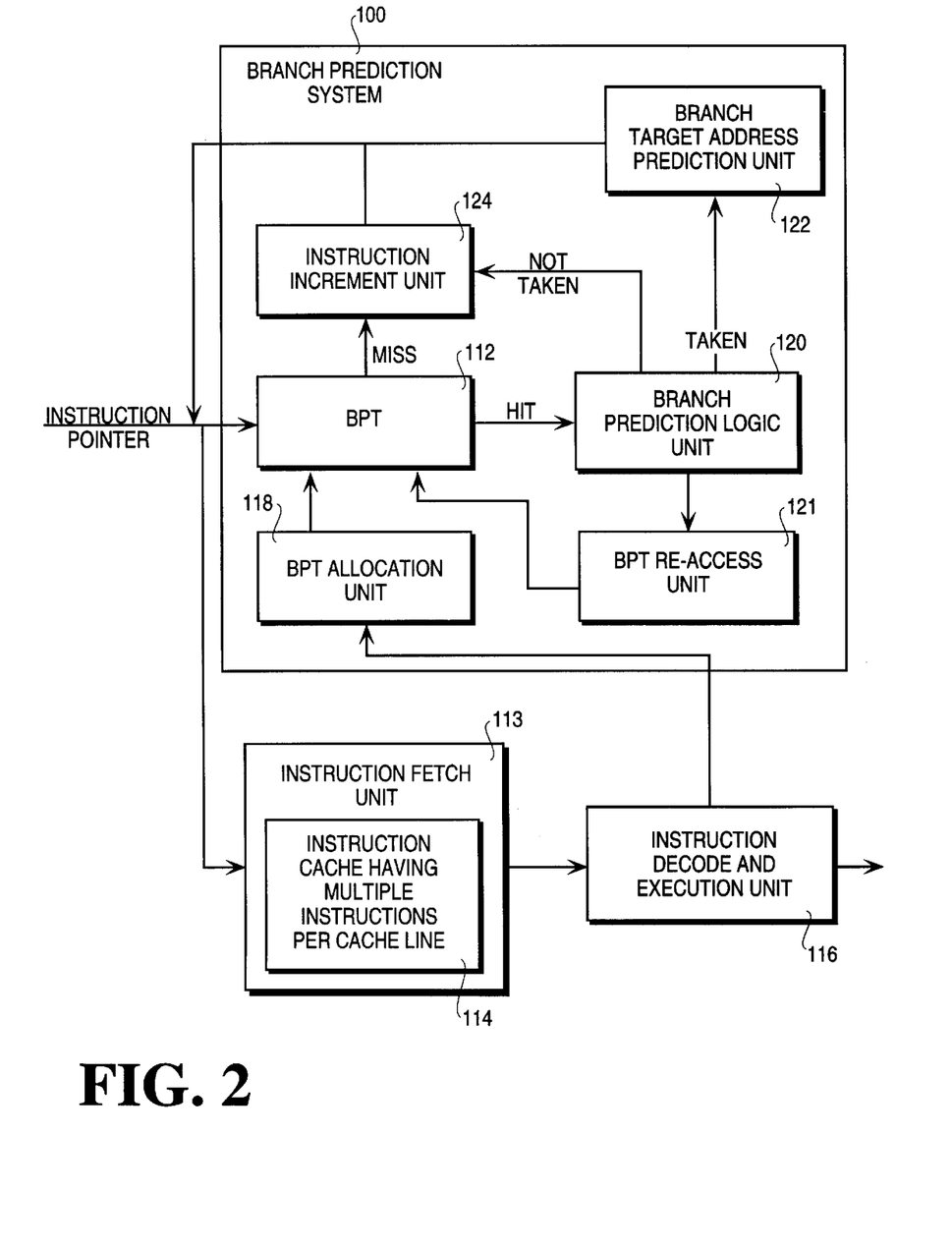
FIG. 2 is a block diagram of a branch prediction system configured in accordance with the invention.

FIG. 2 is a block diagram of a branch prediction system 100 having a BPT 112 containing entries that each have a multiple-B bit value identifying whether other branches within a single cache line corresponding to the entry contain branch conditions. Branch prediction system 100 is employed in connection with an IFU 113 having an ICache 114 capable of storing two instructions per cache line. FIG. 2 also illustrates an instruction decode and execute unit 116 for decoding and executing instructions fetched by IFU 113.

Branch prediction system 100 includes, in addition to BPT 112, a BPT allocate unit 118 and a branch prediction logic unit 120. Logic unit 120 is connected to a BPT reaccess unit 121 which, as will be described below, reaccesses BPT 112 following detection of a hit signal for each entry having a set multiple-B bit. Branch prediction system 100 also includes a branch target address prediction unit 122 and an instruction pointer increment unit 124. BPT 112, in an embodiment, is a four-way set associative table.

In use, an instruction pointer providing a tag value and a bundle position value is received, substantially simultaneously, by BPT 112 and IFU 113. IFU 113 accesses ICache 114 using the tag value to find an instruction cache line containing an instruction corresponding to the instruction pointer. As noted, ICache 114 stores two instructions per cache line. The first instruction of each cache line is identified by a bundle position value of zero. The second is identified by a bundle position value of one. The two instructions of each cache line are sequential instructions arranged in the order originally appearing in memory (not separately shown). If ICache 114 does not include a cache line corresponding to the tag value, then the separate memory is accessed to read in the two sequential instructions corresponding to the tag value for storing within ICache 114. Each instruction includes, among other values, a branch value identifying whether the instruction includes a branch condition. Instructions fetched by IFU 113 are decoded by instruction decode and execute unit 116 which examines the branch values stored therein. For each instruction containing the branch value, the instruction decode and execute unit activates BPT allocate unit 118 to allocate an entry within BPT 112 corresponding to that branch. Accordingly, for each pair of instructions fetched by IFU 113, the BPT allocate unit may allocate one, two or no entries in the BPT.

As noted, BPT 112 receives the instruction pointer substantially simultaneously with IFU 113. The BPT accesses entries stored therein, using the tag value and the bundle position value corresponding to instruction pointer to determine if any entries corresponding thereto are stored within the BPT. Initially, the access is performed using a bundle position value of zero to find any branches corresponding to the first instruction of the corresponding instruction line. Initially, the BPT will be empty and no entries will be found. Accordingly, a miss signal is generated and instruction increment unit 124 increments the instruction pointer to identify the next instruction. The next instruction has the same tag value but a bundle position value of one. The incremented instruction pointer is fed back to the inputs of the BPT and the IFU. The IFU ignores the new instruction pointer since it corresponds to the same tag value already employed to access the ICache. The BPT, however, accesses its internal cache lines using the tag value and the new bundle address value. If the BPT is empty, a miss signal is again generated and the instruction pointer is again incremented.

Figure 3:
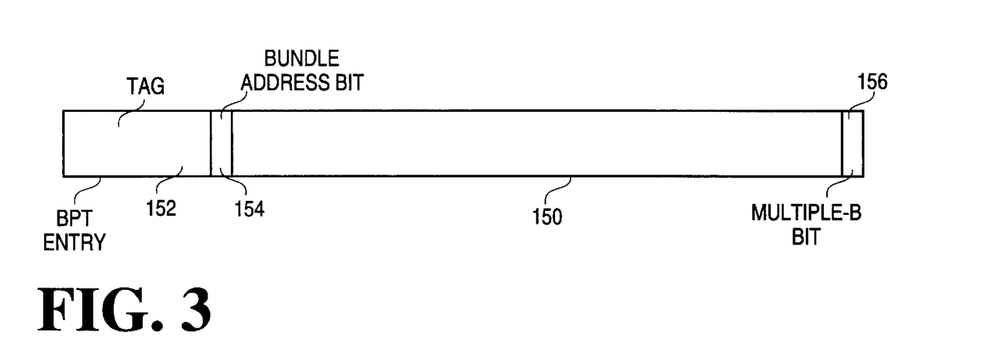
FIG. 3 is a block diagram of an entry of a branch prediction table of the system of FIG. 2.

As processing continues, more and more instructions are fetched, and more and more entries are allocated within the BPT for branches detected within the instructions by the instruction decode and execute unit. Eventually, the BPT receives an instruction pointer having a tag value and bundle position value corresponding to a branch entry contained therein and a hit signal is generated. Branch prediction logic unit 120 receives the hit signal along with branch information contained therein. FIG. 3 illustrates an exemplary entry 150 within BPT 112. Entry 150 includes a tag value 152, a bundle position bit 154, which is either zero or one, and a multiple-B bit 156. Other information, contained within the entry, but not separately shown in FIG. 3, includes branch history information and information regarding the type of branch. The specific additional information contained therein depends upon the type of information required by the branch processing logic which may differ from implementation to implementation.

Multiple-B bit 156 is set to one during allocation if the other branch of the same instruction line also contains a branch as determined by the instruction decode and execute unit from an examination of the branch bit of the instructions fetched by the IFU. The multiple-B bit is set to zero if the other instruction does not contain the branch. The branch prediction logic unit 120 examines the multiple-B bit and determines therefrom whether the other instruction contained within the same instruction cache line also contains the branch. This information is employed, in some circumstances, to initiate a reaccess of the BPT to search for a second entry corresponding to the other branch. Initially, however, the BPT logic unit performs a prediction based upon the first instruction received from the BPT along with the hit signal. The prediction is either Taken or Not Taken. If Not Taken, the instruction increment unit 124 is again activated to increment the instruction pointer. If Taken, the branch target address prediction unit 122 is activated to predict the target address for the Taken branch. Depending upon the implementation, the target address may be contained within the information output from the BPT along with the hit signal. The branch target address prediction unit outputs a new instruction pointer corresponding to the target address for feedback to the BPT and the instruction cache. Any instructions fetched based upon the predicted branch are speculative instructions which, as described above in the Background of the Invention section, are not retired or otherwise committed to a final state until it can be verified that the branch prediction is correct.

As noted, the branch prediction logic unit examines information received from the BPT and predicts whether the branch will be Taken or Not Taken. While this prediction is performed, the branch prediction logic unit examines the multiple-B bit to determine whether the other instruction corresponding to the same instruction line of the current branch is also a branch. If so, the reaccessed BPT unit is activated to reaccess the BPT to determine if an entry corresponding to the other branch is contained therein. If so, a second hit signal is generated and information corresponding to the other branch is output to the branch prediction logic unit which immediately begins to perform a "secondary" prediction for the other branch. In other words, predictions for both branches can be performed almost simultaneously. If the prediction for the first branch is Not Taken, the branch prediction logic unit outputs, during the next clock cycle, a prediction for the second branch. In this manner, a pair of branch predictions for both branches of a single instruction cache line are output in two consecutive clock cycles. If the prediction for the first branch is Taken, then the branch prediction logic unit does not output a prediction for the second branch since the second branch is predicted to be skipped or jumped over. In other words, the generation of two predictions in two consecutive clock cycles only occurs if the first prediction is Not Taken. Moreover, two predictions in two consecutive clock cycles is only performed if the first entry generating the hit signal corresponds to the first bundle of the instruction line. If the first hit signal corresponds to the second bundle of the instruction line, then an immediate subsequent prediction cannot be performed. This is because the multiple-B bit of a second instruction of an instruction line only indicates whether the first instruction of the instruction line contains a branch. Moreover, if the second instruction of the cache line is the first instruction triggering a hit signal for that cache line, then a prediction for the first instruction is not necessary. Either a prediction for that first instruction has already been performed or the first instruction was jumped over. In either case, the branch prediction logic need not attempt to perform a prediction for the first instruction cache line. Thus, the secondary prediction of the branch prediction logic unit is only performed following a hit signal corresponding to the first instruction of a cache line (i.e., bundle address equals zero). Moreover, the secondary prediction is only output if the prediction for the first instruction is Not Taken.

Figure 4:
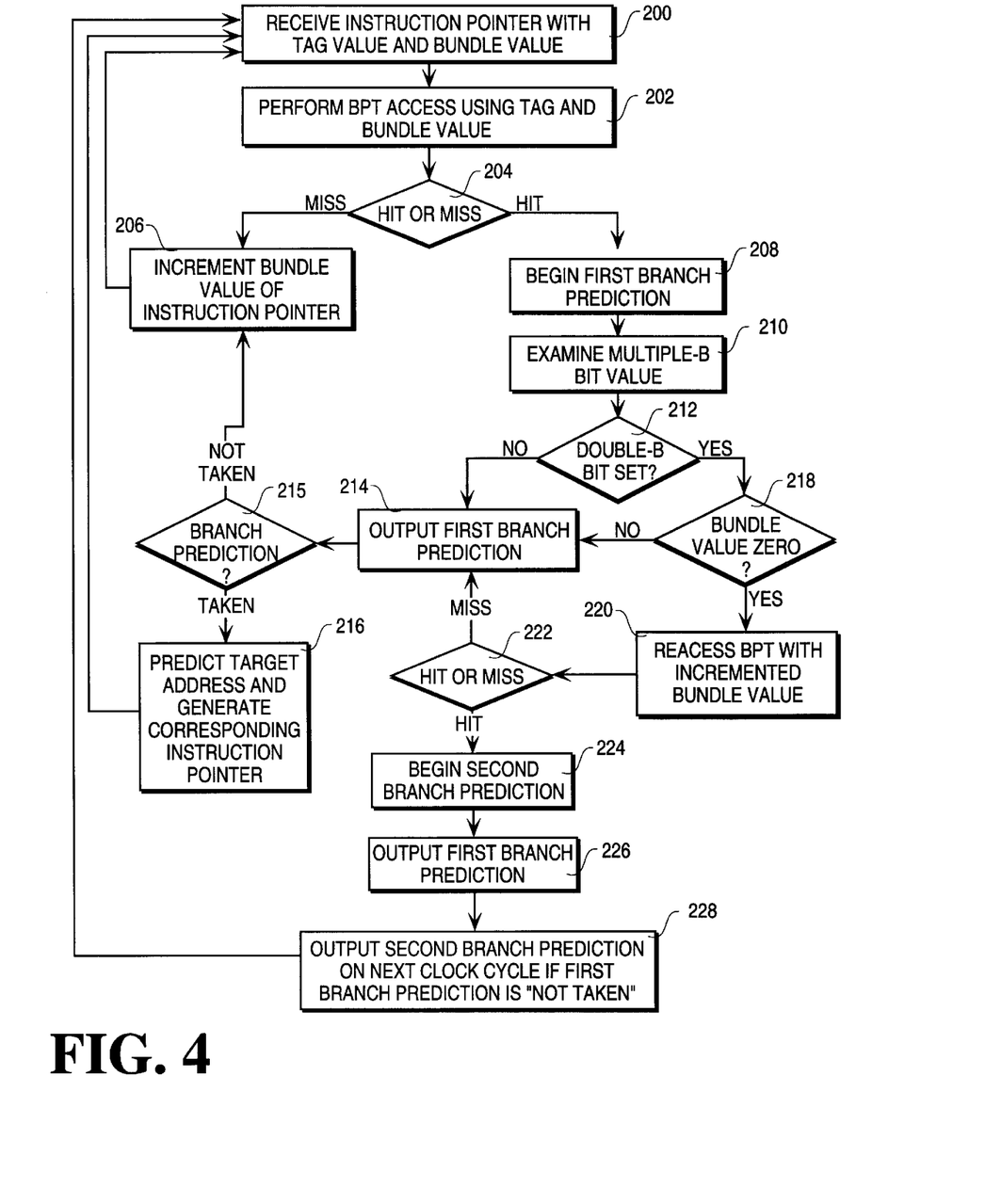
FIG. 4 is a flowchart illustrating a method for performing branch predictions using the branch prediction system of FIGS. 2 and 3.

FIG. 4 provides a flowchart summarizing the operation of the branch prediction system of FIG. 2. Initially, at step 200, the branch prediction system receives an instruction pointer with a tag value and a bundle value. The bundle value is either zero or one and identifies whether the instruction pointer is pointed to the first instruction or the second instruction of a cache line containing the instruction. The tag value and the bundle value may be either contained within the instruction pointer or determined from the instruction pointer. Next, at step 202, the BPT is accessed using the tag and bundle value and either a hit signal or a miss signal is generated, step 204. If a miss signal is generated then, at step 206, the bundle value of the instruction pointer is incremented and flow returns to step 200 where another instruction is received. In this regard, if the bundle value is initially zero the value is incremented to one but the tag value remains the same. The bundle value is one, the tag is incremented to the next tag value and the bundle value is reset to zero.

Execution of steps 200–206 continues until a hit signals is detected at step 204 after which execution proceeds to step 208 where the branch prediction logic begins to perform a entry prediction for the branch generating the hit signal. While the branch prediction is being performed, the branch prediction logic examines the multiple-B bit value of the corresponding entry from the BPT, at step 210, to determine whether the multiple-B bit value is set, step 212. If the multiple-B bit is not set, then execution proceeds to step 214 where branch prediction logic eventually outputs a prediction corresponding to the entry generating a hit signal. If the branch prediction is Not Taken, execution proceeds to step 206 where the instruction pointer is incremented. If the prediction is Taken, execution proceeds to step 216 where a target address for the branch is predicted and a new instruction pointer corresponding to the target address is generated. In either case, execution ultimately returns to step 200.

If, at step 212, the multiple-B bit is set, execution proceeds to step 218 where the bundle value is examined to determine whether the value is zero. If zero, the current bundle is the first bundle of an instruction line. If one, the current bundle is the second bundle of the instruction line. If not zero, execution again proceeds to step 214 where the first branch prediction is output. No subsequent secondary branch prediction must be performed immediately because the current branch is the second branch of the instruction line and no information is yet available as to whether the first instruction of the next instruction line contains the branch. If, at step 218, the bundle value is zero, then a secondary branch prediction may be performed. Accordingly, at step 220, the BPT is reaccessed with an incremented bundle value to determine if an entry is provided therein corresponding to the second instruction of the cache line. A second hit or miss signal is generated at step 222. If the reaccess is a miss, execution again returns to step 214. No secondary prediction is performed based upon the miss because no information is contained within the BPT. If, however, the reaccess generates a hit, then the branch prediction logic begins a second branch prediction. The second branch prediction is a prediction for the second branch of the same instruction line. This is performed at step 224. Eventually, at step 226, the first branch prediction is output. Then, at step 228, the second branch prediction is output. The second branch is output only if the prediction for the first branch is "Not Taken". If the prediction for the first branch is Taken, then the second branch is expected to be skipped over and hence no prediction is needed.

Thus, FIG. 4 summarizes the processing of branch predictions using the branch prediction system of FIG. 2. However, the method of FIG. 4 may be performed using other systems than those illustrated in FIG. 2. Moreover, the system of FIG. 2 may operate to perform other methods than the ones implicitly illustrated in FIG. 4.

Figure 5:
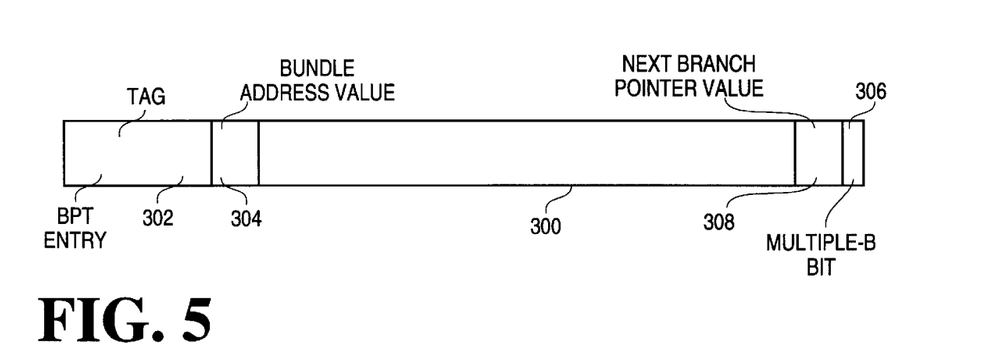
FIG. 5 is a block diagram of a BPT entry employed by a branch prediction system configured in accordance with an alternative embodiment of the invention.

In the foregoing, branch prediction is performed in a system wherein two instructions are stored for each cache line. In the following, a more general case is described wherein each cache line stores N instructions wherein N is two or more. As with the two prediction case, a secondary instruction is performed for a second instruction containing a branch within a cache line if a first instruction containing a branch generates a prediction of "Not Taken". However, whereas BPT entries of the two instruction system contain a multiple-B bit identifying whether the other instruction contains a branch, the multiple instruction system provides an additional value identifying the bundle address for the next instructions containing a branch. FIG. 5 illustrates an exemplary BPT entry 300. As before, the BPT entry includes a tag value 302, a bundle address 304 and a multiple-B bit value 306. Whereas the bundle address for the two instruction system is only a single bit, the bundle address for the multiple instruction system is a multiple bit value having sufficient bits to uniquely identify each bundle position. For a system wherein N is eight, the bundle position value may be a 3-bit value. Entry 300 also includes a next branch pointer value 308 which contains the bundle value of the next instruction containing a branch. Again, the bundle value is multiple bit value having a sufficient number of bits to encode a bundle location. For a system wherein N is eight, the bundle pointer value may be a 3-bit value. BPT entry 300 may include many additional values, not separately shown, for facilitating branch prediction including branch history values and value identifying the type of branch.

Figure 6:
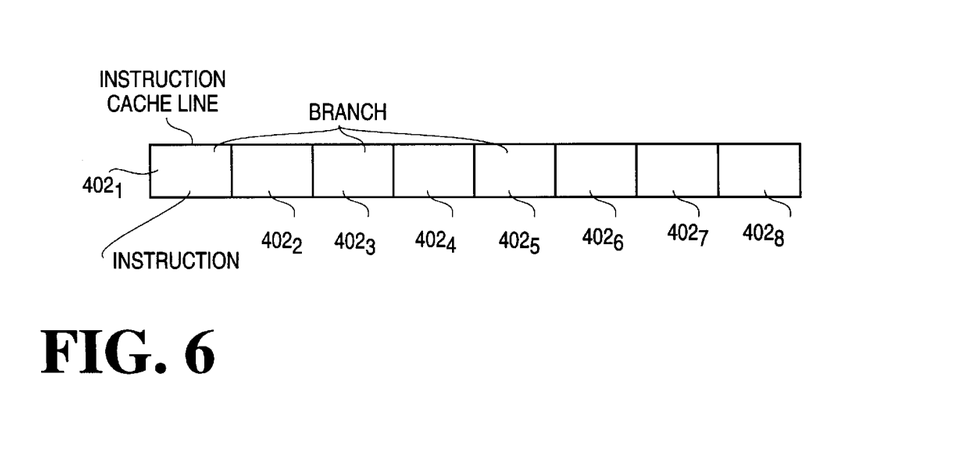
FIG. 6 is a block diagram of an instruction cache line having eight instructions.

FIG. 6 illustrates an exemplary cache line for use with an instruction cache storing multiple instructions for cache line. An example of FIG. 6 the cache line stores eight instructions. More specifically, FIG. 6 illustrates a cache line 400 having individual instructions $402_1$–$402_8$. Instructions $402_1$, $402_3$ and $402_5$ are branches. The remaining instructions are not. A branch bit value (not shown) provided within each instruction identifies whether the instruction corresponds to a branch or not. During a decode operation, a instruction decode and execute unit examines the branch values and triggers a BPT allocation unit to allocate entries for each instruction containing a branch. Hence, the BPT will, initially, contain entries corresponding to the branches of instructions $402_1$, $402_3$ and $402_5$. Eventually, some of the entries of the BPT corresponding to the instructions may be deallocated to allow room for other entries corresponding to other instruction cache lines. In particular, entries corresponding to branches that are ultimately determined to be Not Taken may be deallocated from the BPT.

Processing of BPT entries proceeds in much the same manner as described above with reference to the two instruction case. However, the BPT reaccess unit utilizes the branch pointer value (FIG. 5) during reaccess operation to search for entries corresponding to the next branch contained within the cache line. As before, if a prediction for a first branch is Not Taken, and an entry for the next branch is found, then the branch prediction logic outputs a prediction for the next branch one clock cycle after outputting a prediction for the firs branch. However, whereas the two instruction case provides for only two stages of predictions, the multiple instruction case allows for multiple stages of predictions. For example, consider a case where entries corresponding to instructions $402_1$, $402_3$ and $402_5$ are all contained within the BPT. Initially, the branch prediction logic performs a prediction for instruction $402_1$ and begins performing a prediction for $402_3$ by reaccessing the BPT. Once the branch prediction logic unit obtains the entry for $402_3$, it will again reaccess the BPT to search for information corresponding to instruction $402_5$. Ultimately, if the prediction for $402_1$ is Not Taken, then the branch prediction logic outputs the prediction for $402_3$ one clock cycle later. Likewise, if the prediction for $402_3$ is also Not Taken, the branch prediction logic outputs a prediction for $402_5$ one clock cycle later. In this manner, for a system where N equals eight, eight branch predictions may be output during consecutive clock cycles. Of course, this will typically be rare since eight consecutive predictions will only occur if all eight entries are allocated in the BPT and if the first seven branch predictions are all Not Taken. Accordingly, in some implementations, rather than providing additional circuitry within the branch prediction logic for allowing eight simultaneous predictions, the system may be configured only to allow two or three consecutive predictions. As can be appreciated, a wide variety of alternative implementations are available.

As noted above, each entry in the BPT corresponding to instructions of cache line 400 contain a bundle pointer value pointed to the next instruction containing a branch. The pointers only point to higher instructions. In other words, the pointer for $402_5$ will not point back to $402_1$. Such a "downstream" bundle pointer is typically not necessary because, by the time an up-stream bundle is processed, the downstream bundle will either have already been processed or would have been passed over as a result of a previous jump operation. In either case, no significant advantage is gained by providing a down-stream pointer. However, in some implementations, such a down-stream pointer may be desirable. In still other cases, rather than providing a separate multiple-B bit to identify whether at least one other instruction contains a branch, a bundle pointer value of zero is employed for that purpose. In other words, the bundle pointer values for all entries are set to zero if none of the instructions of the cache line contain branches.

What has been described are various embodiments of the branch prediction system wherein information identifying whether other instruction within a common cache line contain branches are stored within the BPT entries. Various exemplary embodiments have been described for the purpose of illustrating principles of the invention. However, these embodiments should not be construed as limiting the scope of the invention.

What is claimed is:

1. An apparatus for executing instructions in a microprocessor, comprising:

an instruction cache that stores multiple instructions in a cache line;

a branch prediction table (BPT) coupled to the instruction cache and including a plurality of entries each associated with a branch instruction of a cache line, wherein each BPT entry includes a tag value corresponding to the cache line and a next branch pointer value, and wherein a BPT entry associated with a first branch instruction is accessed using the tag value and multiple branch information that indicates whether more than one instruction of a cache line is a branch instruction; and, a BPT reaccess unit coupled to the branch prediction logic unit and to the BPT, wherein, if the multiple branch information indicates that more than one instruction of the cache line is a branch instruction, the BPT reaccess unit causes the BPT to be immediately reaccessed to locate an entry for a next sequential branch instruction.

2. The apparatus of claim 1, further comprising a branch prediction logic unit coupled to the BPT, wherein the BPT entry further includes branch history information used by the branch prediction logic unit to predict whether a first branch indicated by the first branch instruction will be taken and wherein, if the first branch is predicted not to be taken, the next branch pointer value is used to determine a next sequential branch instruction of the cache line.

3. The apparatus of claim 1, wherein the multiple branch information comprises at least one bit stored in a BPT entry.

4. The apparatus of claim 1, wherein each BPT entry further includes a bundle address value used with the tag value to access the BPT entry.

5. A method of processing instructions, comprising the steps of:

allocating a branch prediction table (BPT) entry for a branch instruction, the BPT entry including lookup information including information indicating an instruction cache line containing the branch instruction and a bundle value indicating a location of the branch instruction in the instruction cache line;

performing an initial BPT lookup for a first branch instruction of a cache line;

if an entry is allocated in the BPT for the first branch instruction, beginning a first branch prediction;

determining whether the first branch instruction is an only branch instruction in the cache line; and if the first branch instruction is not the only branch instruction in the cache line, immediately performing a next BPT lookup for a next sequential branch instruction.

6. The method of claim 5, further comprising the steps of:

if a BPT entry is allocated for the next sequential branch instruction, beginning a next branch prediction; and if the first branch prediction is "not taken", outputting the next branch prediction.

7. The method of claim 6, further comprising the steps of:

if the first branch instruction is not the only branch instruction, incrementing the bundle value; and performing the next BPT lookup using the incremented bundle value.

8. The method of claim 7, further comprising the steps of:

if no BPT entry is allocated for the next sequential instruction, outputting the first branch prediction;

if the first branch prediction is "taken", predicting a target address; and generating an instruction pointer corresponding to the predicted target address.

9. The method of claim 6, wherein, if the first branch prediction is "not taken", the next branch prediction is output during a next clock cycle.

10. A method for performing sequential branch predictions in consecutive clock cycles, comprising the steps of:

performing a branch prediction table (BPT) access for a first branch instruction of a cache line in a first clock cycle;

determining whether the first branch instruction is the only branch instruction of the cache line; and if the first branch instruction is not the only branch instruction of the cache line, performing a next BPT access for a next sequential branch instruction of the cache line in a clock cycle immediately following the first clock cycle.

11. The method of claim 10, further comprising the steps of:

if the BPT access for the first branch instruction is a hit, beginning a first branch prediction for the first branch instruction; and if the first branch prediction is "not taken", incrementing an instruction pointer value; and using the incremented branch instruction value to perform a BPT access.

12. The method of claim 10, further including the steps of:

if the first branch prediction is "taken", predicting a target address; and generating an instruction pointer corresponding to the predicted target address; and using the generated instruction pointer to perform a BPT access.

13. The method of claim 10, further comprising the steps of:

if the next BPT access is a hit, beginning a next branch prediction; and if the first branch prediction is "not taken", outputting the next branch prediction.

14. The method of claim 10, further comprising the step of, if the next BPT access is a miss, outputting the first branch prediction.

15. The method of claim 10, wherein the step of determining comprises interpreting information that indicates whether a cache line contains more than one branch instruction.

16. The method of claim 15, wherein the information is at least one bit stored in a BPT entry.

17. The method of claim 16, wherein the at least one bit is a pointer to a next branch instruction of the cache line.

18. The method of claim 16, wherein the at least one bit is a multiple branch bit.

* * * * *